United States Patent
Childers

(10) Patent No.: US 7,154,508 B2
(45) Date of Patent: Dec. 26, 2006

(54) DISPLAYING LEAST SIGNIFICANT COLOR IMAGE BIT-PLANES IN LESS THAN ALL IMAGE SUB-FRAME LOCATIONS

(75) Inventor: Winthrop D. Childers, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/334,215

(22) Filed: Jan. 17, 2006

(65) Prior Publication Data

US 2006/0114539 A1 Jun. 1, 2006

Related U.S. Application Data

(62) Division of application No. 10/836,463, filed on Apr. 30, 2004, now Pat. No. 7,023,449.

(51) Int. Cl.
G09G 5/02 (2006.01)

(52) U.S. Cl. .............. 345/589; 345/598; 345/597; 345/600; 345/613

(58) Field of Classification Search ............ 345/589, 345/597, 598, 600, 613
See application file for complete search history.

(56) References Cited

U.S. PATENT DOCUMENTS

| | | |
|---|---|---|
| 4,662,746 A | 5/1987 | Hornbeck |
| 4,827,334 A | 5/1989 | Johnson et al. |
| 4,956,619 A | 9/1990 | Hornbeck |
| 5,032,924 A | 7/1991 | Brown et al. |
| 5,061,049 A | 10/1991 | Hornbeck |
| 5,079,544 A | 1/1992 | DeMond et al. |
| 5,083,857 A | 1/1992 | Hornbeck |
| 5,105,265 A | 4/1992 | Sato et al. |
| 5,402,184 A | 3/1995 | O'Grady et al. |
| 5,490,009 A | 2/1996 | Venkateswar et al. |
| 5,663,749 A | 9/1997 | Farris et al. |
| 5,689,283 A | 11/1997 | Shirochi |
| 5,842,762 A | 12/1998 | Clarke |
| 5,897,191 A | 4/1999 | Clarke |
| 5,978,518 A | 11/1999 | Oliyide et al. |
| 6,025,951 A | 2/2000 | Swart et al. |
| 6,104,375 A | 8/2000 | Lam |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,313,888 B1 | 11/2001 | Tabata |

(Continued)

FOREIGN PATENT DOCUMENTS

EP 0 364 043 A1 4/1990

(Continued)

OTHER PUBLICATIONS

Christopher Jaynes et al, "Super-Resolution Composition in Multi-Projector Displays", Univ. of Kentucky.

Primary Examiner—Kee M. Tung
Assistant Examiner—Mike Rahmjoo

(57) ABSTRACT

A color image is produced from image data. Color image bit-planes are generated from the image data. Each color image bit-plane represents a time increment for displaying one color of a plurality of colors for each pixel of the color image. For each of the colors, color patterns are displayed in a plurality of image sub-frame locations. The color patterns represent the color image bit-planes. At least the least significant color image bit-planes are displayed in less than all of the image sub-frame locations.

24 Claims, 14 Drawing Sheets

U.S. PATENT DOCUMENTS

| | | |
|---|---|---|
| 6,366,387 B1 | 4/2002 | Wilson |
| 6,384,816 B1 | 5/2002 | Tabata |
| 6,393,145 B1 | 5/2002 | Betrisey et al. |
| 7,019,881 B1 | 3/2006 | Doherty et al. |
| 2003/0146893 A1* | 8/2003 | Sawabe ..................... 345/89 |
| 2003/0214493 A1* | 11/2003 | Akimoto et al. ............ 345/204 |
| 2004/0066363 A1* | 4/2004 | Yamano et al. ............... 345/98 |
| 2005/0184676 A1* | 8/2005 | Hori et al. ................ 315/169.4 |
| 2005/0243100 A1* | 11/2005 | Childers ................... 345/589 |

FOREIGN PATENT DOCUMENTS

| | | |
|---|---|---|
| EP | 0 492 661 A2 | 7/1992 |
| EP | 0 492 721 A2 | 7/1992 |
| EP | 0 509 630 A2 | 10/1992 |
| EP | 0 749 248 A1 | 12/1996 |
| EP | 1 001 306 A2 | 5/2000 |
| EP | 1 503 335 A1 | 2/2005 |
| GB | 2 142 203 A | 1/1985 |
| JP | 60-132476 | 12/1983 |
| JP | 63-292880 | 5/1987 |
| JP | 64-47180 | 8/1987 |
| JP | 2-216187 | 2/1989 |
| JP | 2-250081 | 3/1989 |

* cited by examiner

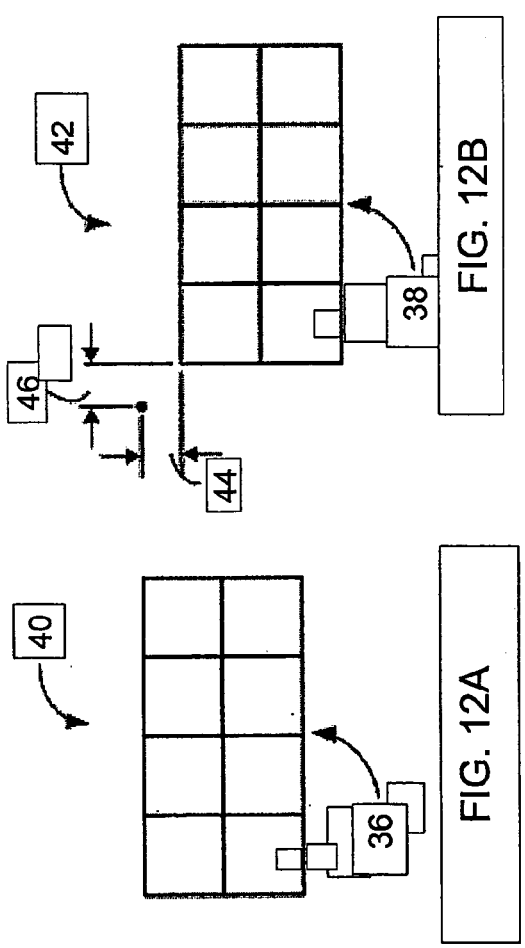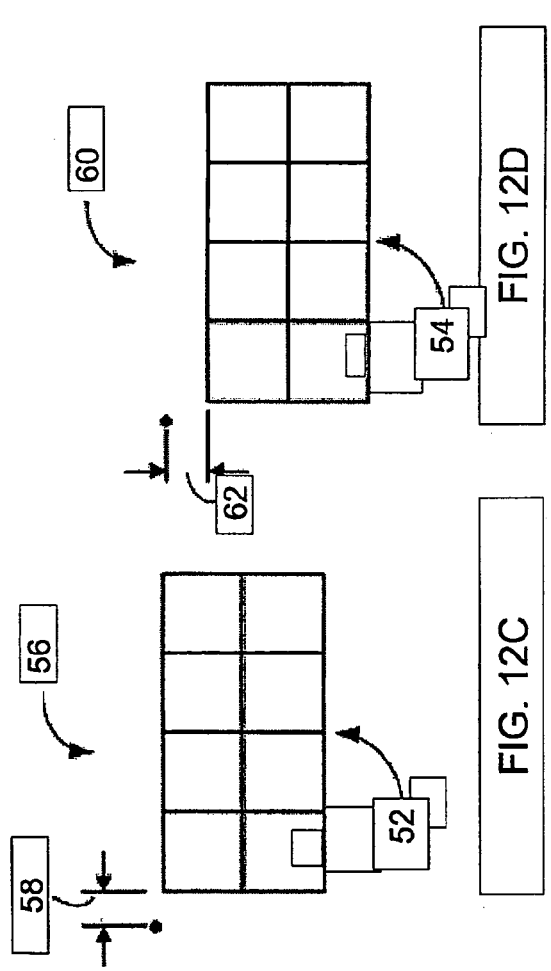

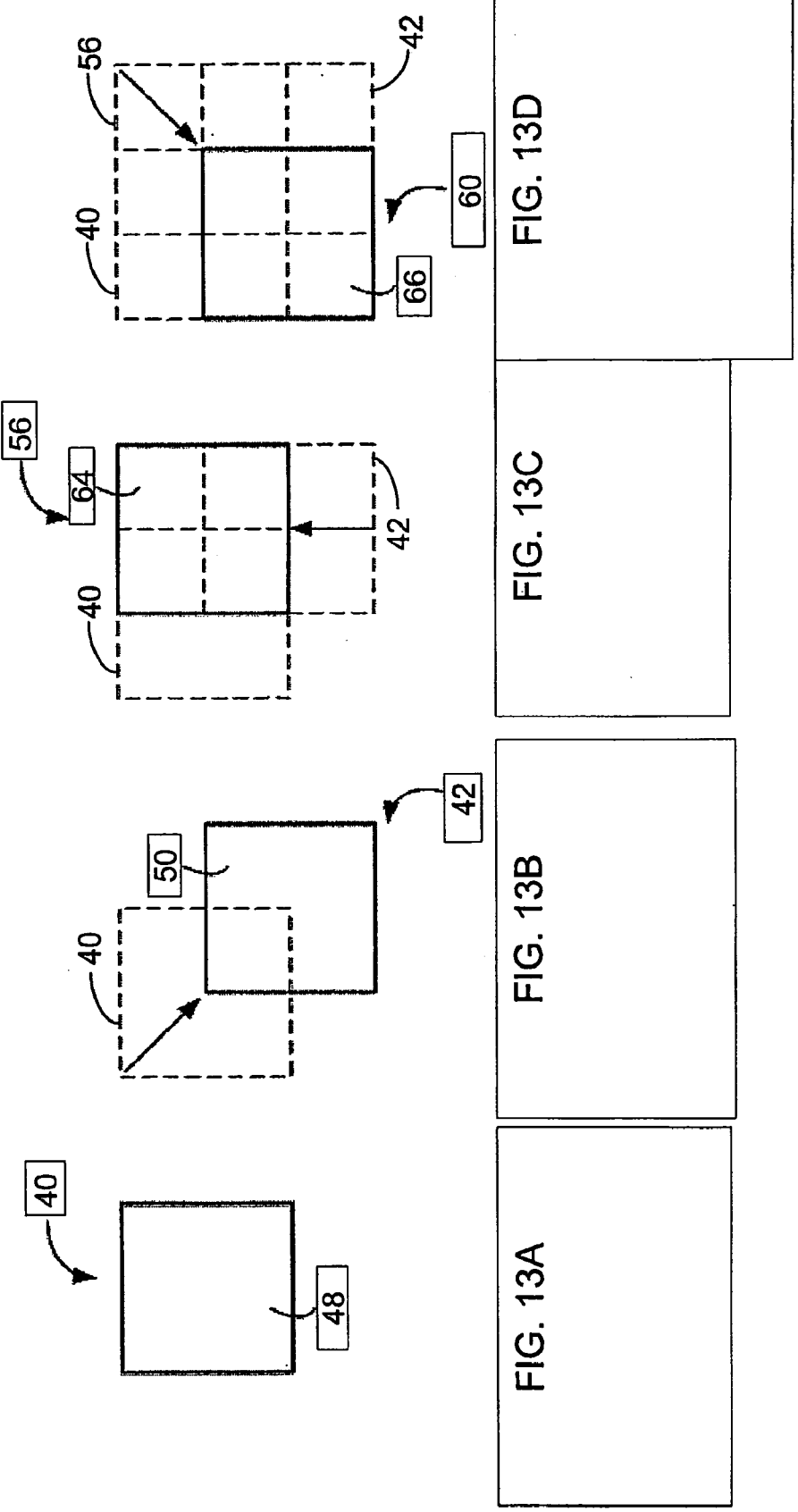

DISPLAYING LEAST SIGNIFICANT COLOR IMAGE BIT-PLANES IN LESS THAN ALL IMAGE SUB-FRAME LOCATIONS

CROSS-REFERENCE TO RELATED APPLICATIONS

This Application is a Divisional of U.S. patent application Ser. No. 10/836,463, filed Apr. 30, 2004 now U.S. Pat. No. 7,023,449, and herein incorporated by reference.

BACKGROUND

Sequential display systems produce color image frames by generating a plurality of colors of light in sequence, spatially modulating the colors of light and projecting the spatially modulated colors of light to form the image frames. The colors of light are typically derived from a white light source passed through a color filter wheel, prism, or some other color filter.

In order to remain competitive with alternative technologies, there is a continual need for the sequential display systems to improve image quality factors such as the resolution of the image frames. Issues with enhancing resolution can include an impact on system cost or color depth.

DESCRIPTION OF THE DRAWINGS

FIGS. 12A–D illustrate that the sub-frame generation function may define four image sub-frames for an image frame according to one exemplary embodiment.

FIGS. 13A–D illustrate displaying a pixel from the first sub-frame in a first image sub-frame location, displaying a pixel from the second sub-frame in a second image sub-frame location, displaying a pixel from the third sub-frame in a third image sub-frame location, and displaying a pixel from the fourth sub-frame in a fourth image sub-frame location according to one exemplary embodiment.

DETAILED DESCRIPTION OF THE INVENTION

Figure 1:
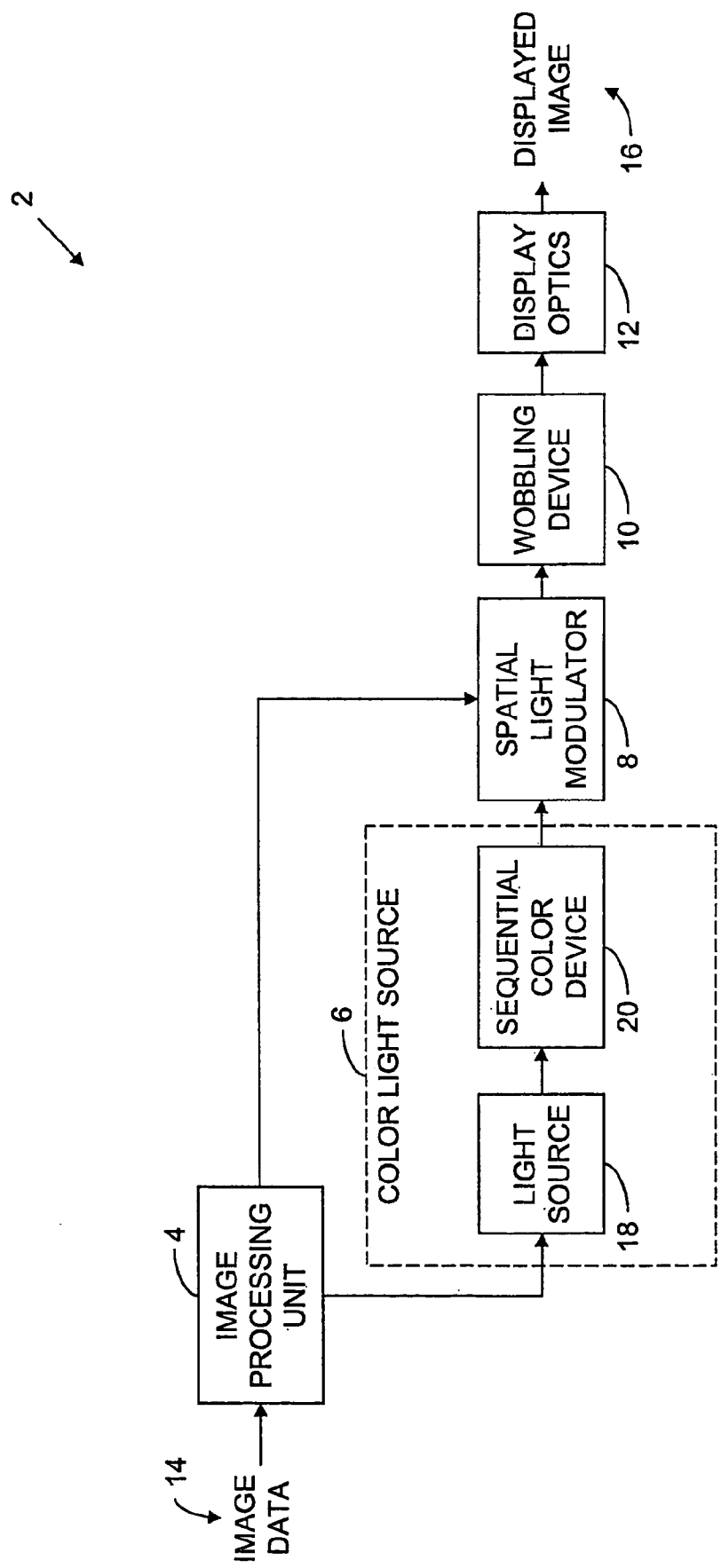
FIG. 1 is a block diagram illustrating one embodiment of the present invention display system.

Illustrated in FIG. 1 is one embodiment of a display system 2 of the present invention. The term "display system" is used herein and in the appended claims, unless otherwise specifically denoted, to refer to a projector, projection system, image display system, television system, video monitor, computer monitor system, or any other system configured to create a sequence of image frames. The sequence of image frames produces an image that may be a still image, a series of images, or motion picture video. The phrase "sequence of image frames" and the term "image" are used herein and in the appended claims, unless otherwise specifically denoted, to refer broadly to a still image, series of images, motion picture video, or anything else that is displayed by a display system.

In the embodiment illustrated in FIG. 1, display system 2 includes image processing unit 4, color light source 6, spatial light modulator (SLM) 8, wobbling device 10, and display optics 12. Display system 2 receives image data 14. In one embodiment, image data 14 is embodied in a data array. Image data 14 defines image 16 to be displayed and display system 2 uses image data 14 to produce displayed image 16. Examples of image data 14 include digital image data, analog image data, and a combination of analog and digital data. While one image 16 is illustrated and described as being processed by display system 2, it will be understood by one skilled in the art that a plurality or series of images 16, or motion picture video display 16, may be processed by display system 2.

Color light source 6 is any apparatus or system configured to generate a plurality of colors of light having a color sequence that periodically varies with a characteristic sequential color time period. Color light source 6 is disposed within display device 2 to pass the plurality of colors of light across SLM 8. In one embodiment, color light source 6 includes light source 18 and sequential color device 20. In an alternative embodiment, color light source 6 may include solid state light sources such lasers or light emitting diodes (LEDs) that generate a sequential color signal. In an illustrative example of the alternative embodiment, the LEDs may comprise red, green, and blue LEDs that are activated in sequence (e.g., first red, then green, and finally blue) to provide the color sequence.

In one embodiment, color light source 6 generates a light beam carrying a sequence of primary colors and optionally white light. Stated another way, color light source 6 outputs a beam having a spectral distribution that changes with time in a periodic manner. For example, color light source 6 may generate a beam that varies between primary colors red, green, and blue as well as white. Color light source 6 may additionally or alternatively output colors such as cyan, yellow, and magenta or any other color. Reference to a light beam of a particular color indicates that the spectral distribution of the light beam has a peak wavelength that can be characterized as visible light of that color. Color filter elements may be used in some embodiments to alter a white light source to provide such a spectral peak.

Light source 18 is any source of light suitable for use in a projector or display device. One example of such a suitable light source 18 is an ultra high-pressure mercury lamp. As shown in FIG. 1, light source 18 provides a beam of light to sequential color device 20.

Sequential color device 20 is any apparatus or system configured to sequentially modulate light from light source 18 into a plurality of colors or wavelengths. In one embodiment, a color time period set point may be set to control the color time period of sequential color device 20. Examples of sequential color devices 20 include a color filter wheel 22 (FIGS. 2–5) and a set of rotating prisms.

FIGS. 2–5 illustrate several examples of color filter wheels 22. Each color filter wheel 22 includes a plurality of color filters 24. Each color of color filter wheel 22 is a color filter element 24. In the figures, R, G, B, and W refer to red, green, blue, and white color filter elements 24. Color filter wheels 22 operate by rotating to sequentially allow only selected colors or wavelengths of light to pass through each color filter element 24.

Although illustrated as having equally sized color filter elements 24 for each color, it is not uncommon for color filter elements 24 to be differently sized. Often the relative sizing of color filter elements 24 is used to accommodate an unbalanced light source 18. For example if light source 18 is red deficient, the red color filter element 24 may be relatively larger than the other color filter elements 24.

Figure 5:
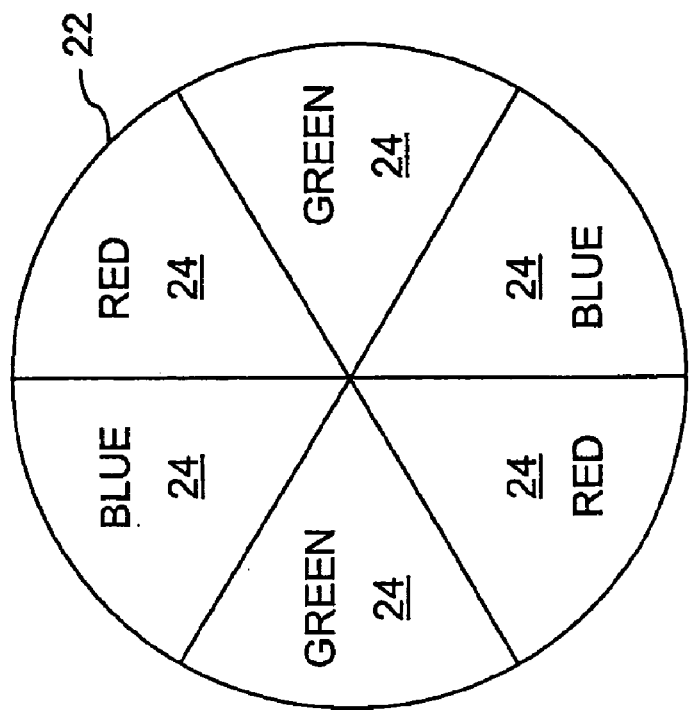
Figure 6:
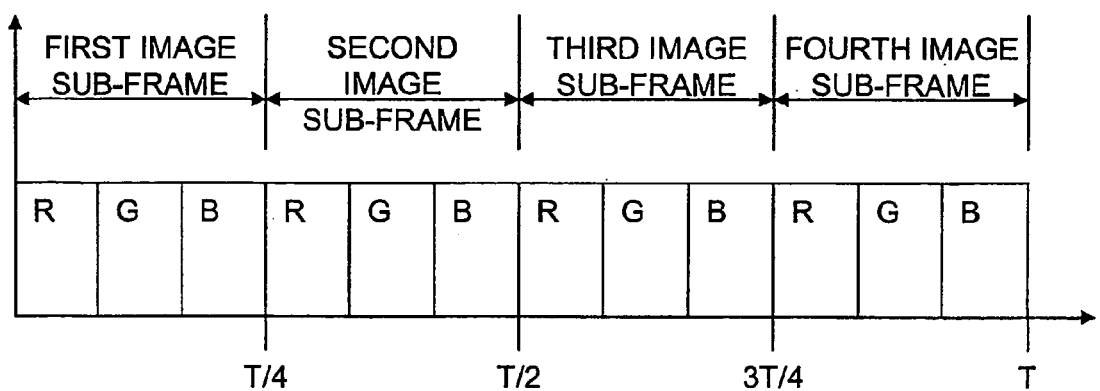
FIG. 6 illustrates an exemplary timing diagram for the color filter wheels shown in FIGS. 3–5.
Figure 7A:
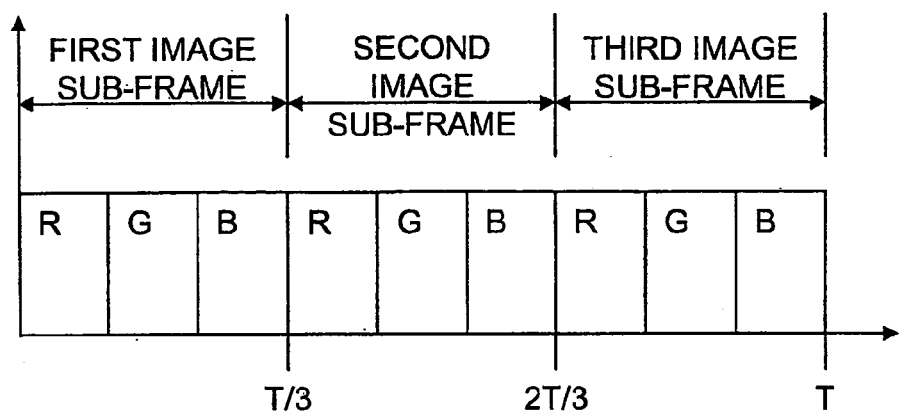
FIGS. 7A–C illustrate alternate exemplary timing diagrams for the color filter wheels shown in FIGS. 3–5.

FIGS. 6 and 7A illustrate the relationship between frame period T and the rotation of a color filter wheel 22. In these figures, R, G, and B, refer to red, green, and blue color sub-frames. Alternatively, as FIGS. 6 and 7A relate to the color filter wheel 22 shown in FIG. 5, R, G, and B refer to red/white, green/white, and blue/white combinations. Although illustrated with the color filter wheels 22 shown in FIGS. 3–5, the graphs shown in FIGS. 6 and 7A could be modified for the color filter wheel shown in FIG. 2 by adding a W after each B within each image sub-frame.

The time during which each frame is being output is frame period T. A spatial or image sub-frame period is a portion of frame period T during which each spatial or image sub-frame is being output. A color sub-frame is a portion of frame period T during which the color light source is outputting a particular color or primary color. Frame period T is any suitable frame period T. An example frame period T is about $1/60^{th}$ of a second. As depicted by FIGS. 6 and 7A a complete set of color sub-frames are generated at least once for each spatial or image sub-frame. Stated another way, color light source 6 generates a complete set of primary colors at least once during a single spatial or image sub-frame.

Figure 3:
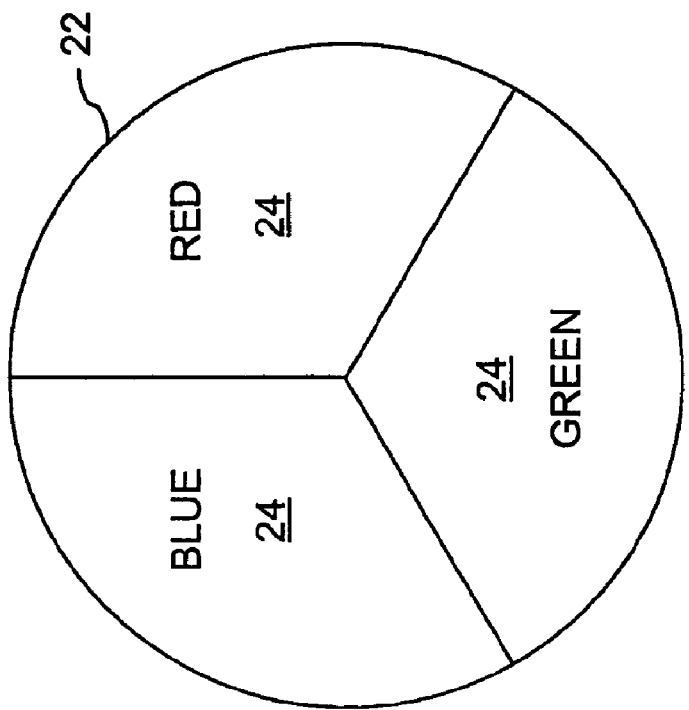
FIGS. 2–5 are examples of color filter wheels used with the display system of FIG. 1.
Figure 2:
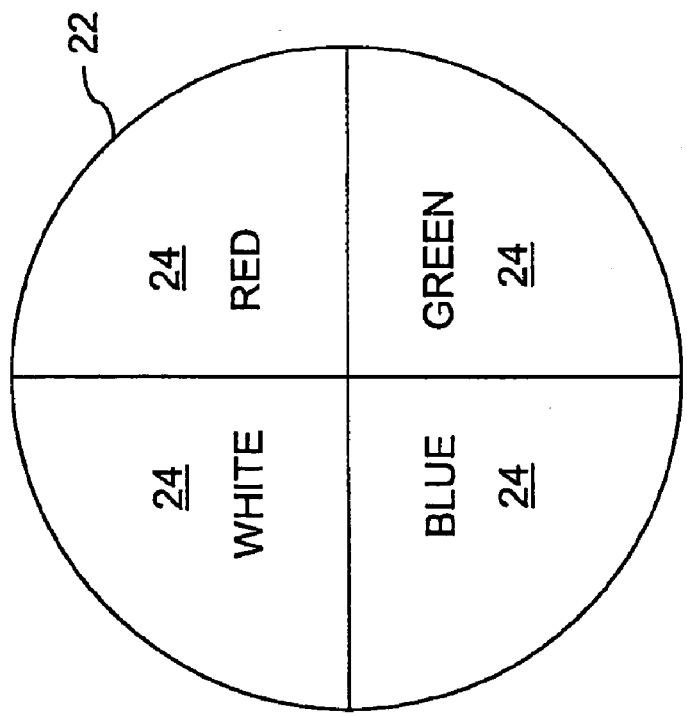
Figure 4:
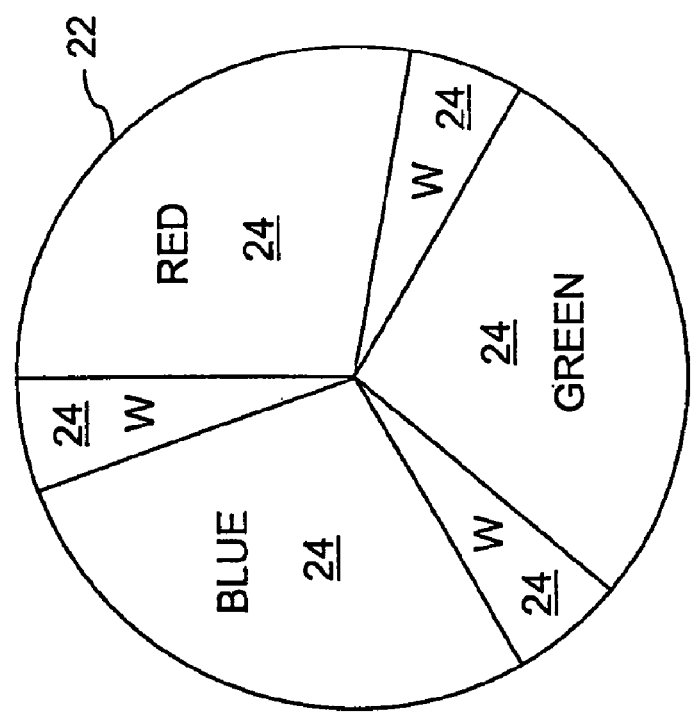

FIG. 6 shows one example of the relationship between frame period T and the rotation of the color filter wheels 22 depicted in FIGS. 3–5. In this example, there are four image sub-frames and the color filter wheel 22 spins with a period equal to one fourth of frame period T, for the color filter wheels 22 of FIGS. 3 and 4, and one half of frame period T, for the color filter wheel 22 of FIG. 5. For example, with frame period T equal to $1/60^{th}$ of a second, the color filter wheels 22 of FIGS. 3 and 4 spin at 14400 RPM, four complete revolutions during frame period T.

The color filter wheel 22 of FIG. 5 spins with a period equal to one half of frame period T but since the color filter wheel 22 of FIG. 5 is an RGBRGB wheel, the effect is the same as the color filter wheel 22 of FIG. 3 spinning twice as fast. At the same frame period T of $1/60^{th}$ of a second, the color filter wheel 22 of FIG. 5 rotates at 7200 RPM.

FIG. 7A shows another example of the relationship between frame period T and the rotation of the color filter wheels 22 depicted in FIGS. 3–5. In this example, there are three image sub-frames and the color filter wheel 22 spins with a period equal to one third of frame period T, for the color filter wheels 22 of FIGS. 3 and 4, and two thirds of frame period T, for the color filter wheel 22 of FIG. 5.

Figure 7B:
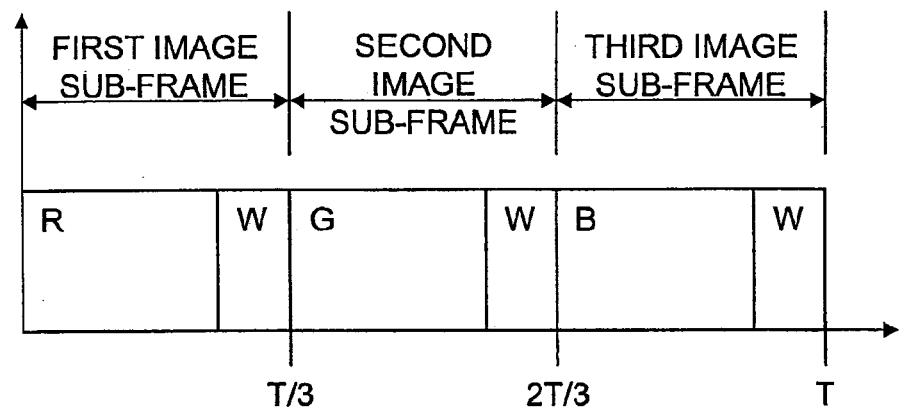

A timing diagram for an alternative system is depicted in FIG. 7B. This depicts the relationship between frame period T and the color wheel depicted in FIG. 4 in the event that primary color sub-frames coincide with image sub-frames. In this embodiment, the white component of the color is generated during all three image sub-frames. On the other hand, the remaining red, green, and blue color sub-frames are each distributed into a separate image sub-frame. This lengthens the sub-frame time period for generating 8 bit color for each of the primary colors.

Figure 7C:
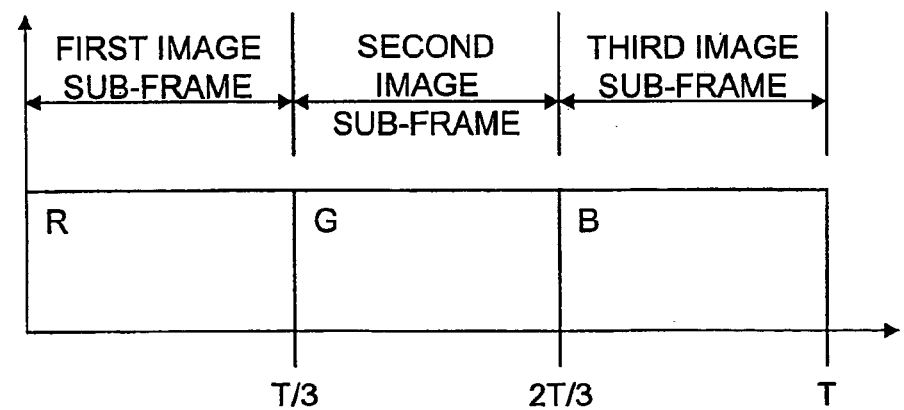

In yet another embodiment, the timing diagram of FIG. 7C can be used with the color wheel depicted with respect to FIG. 3. Again, each image sub-frame contains all the bit planes for one primary color.

For the embodiments depicted in FIGS. 7B and 7C, the projection system displays the primary color sub-frames displaced with respect to each other. Another aspect of this embodiment is that the color sub-frames coincide with shifted image sub-frames. During the first image sub-frame, the projector system generates pixels of a first primary color such as red at a first array of locations. During the second image sub-frame, the projector system generates pixels of a second primary color such as green at a second array of locations. Finally, during the third image sub-frame, the projector system generates pixels of a third primary color such as blue at a third array of locations.

Figure 8:
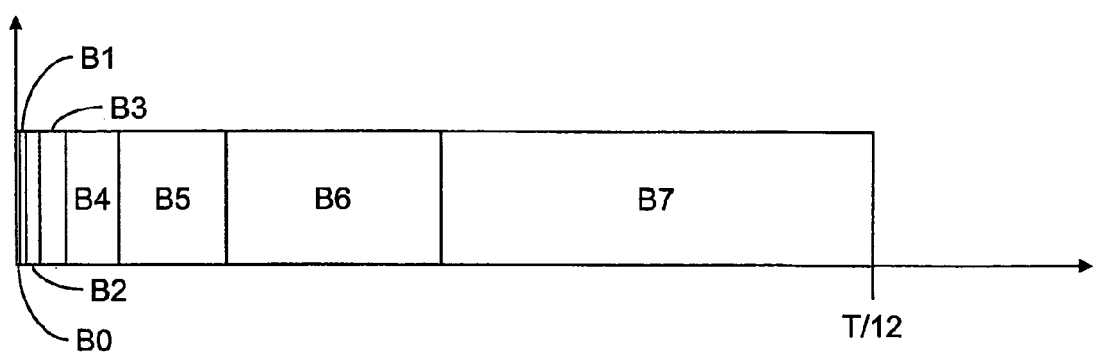
FIG. 8 illustrates one example of relative timing of bit-planes for the timing diagram of FIG. 6.

FIG. 8 shows one example of the relative timing relationship between color image bit-planes B0–B7. A color image bit-plane is a time increment for displaying one color for each pixel of a color image. The color image is an entire image or a region of a larger image. Each color image bit-plane B0–B7 represents a time increment for displaying one color of the color filter wheel 22 for each pixel of a color image. With a three color, color filter wheel 22 and four image sub-frames, the total time for each color is one twelfth of the frame period T.

Each color sub-frame is defined by the color image bit-planes for that color. Together, all of the color image bit-planes define the image sub-frames.

The smallest time increment for each color is represented by a least significant color image bit-plane B0. The largest time increment for each color is represented by a most significant color image bit-plane B7. In the illustrated example, most significant color image bit-plane B7 represents a little over one half of the total time for a color. Each successively smaller color image bit-plane represents one half of the next larger color bit-plane and least significant color image bit-plane B0 represents about $1/255^{th}$ of the total time for each color.

Referring again to FIG. 1, SLM 8 is any apparatus or system configured to modulate light to provide a plurality of image sub-frames for each of the image frames during frame period T. SLM 8 modulates incident light in a spatial pattern corresponding to an electrical or optical input. The incident light may be modulated in its phase, intensity, polarization, or direction by SLM 8.

SLM 8 is disposed to spatially modulate light from color light source 6. Light transmitted by color light source 6 is passed onto SLM 8. In one embodiment, the light is focused onto SLM 8 through a lens or through some other device. SLM 8 modulates the light output by color light source 6 based on input from image processing unit 4 to form an image-bearing beam of light.

Examples of an SLM 8 are a liquid crystal on silicon (LCOS) array and a micro-mirror array. LCOS and micro-mirror arrays are known in the art and will not be explained in detail in the present specification. One example of an LCOS array is the Philips™ LCOS modulator. One example of a micro-mirror array is the Digital Light Processing (DLP) chip available from Texas Instruments™ Inc.

In one embodiment, the modulated light from SLM 8 is eventually displayed by display optics 12 on a viewing surface (not shown). Display optics 12 are any device or system configured to display or project an image. Display optics 12 provide focusing and other optical adjustments, where necessary, for the display of display image 16 by display system 2. One example of display optics 12 includes a lens configured to project and focus displayed image 16 onto a viewing surface. Examples of the viewing surface include a screen, television, wall, or computer monitor. Alternatively, display optics 12 may include a viewing surface onto which displayed image 16 is projected.

Periodic wobbling device 10 is any apparatus or system configured to provide a relative displacement of the image sub-frames for each image frame. In one embodiment, before display optics 12 display displayed image 16, the modulated light is passed through wobbling device 10. One example of a wobbling device 10 is a galvanometer mirror. In alternate embodiments, the functionality of the wobbling device 10 is integrated into SLM 8 or some other component of display system 2.

Figure 9:
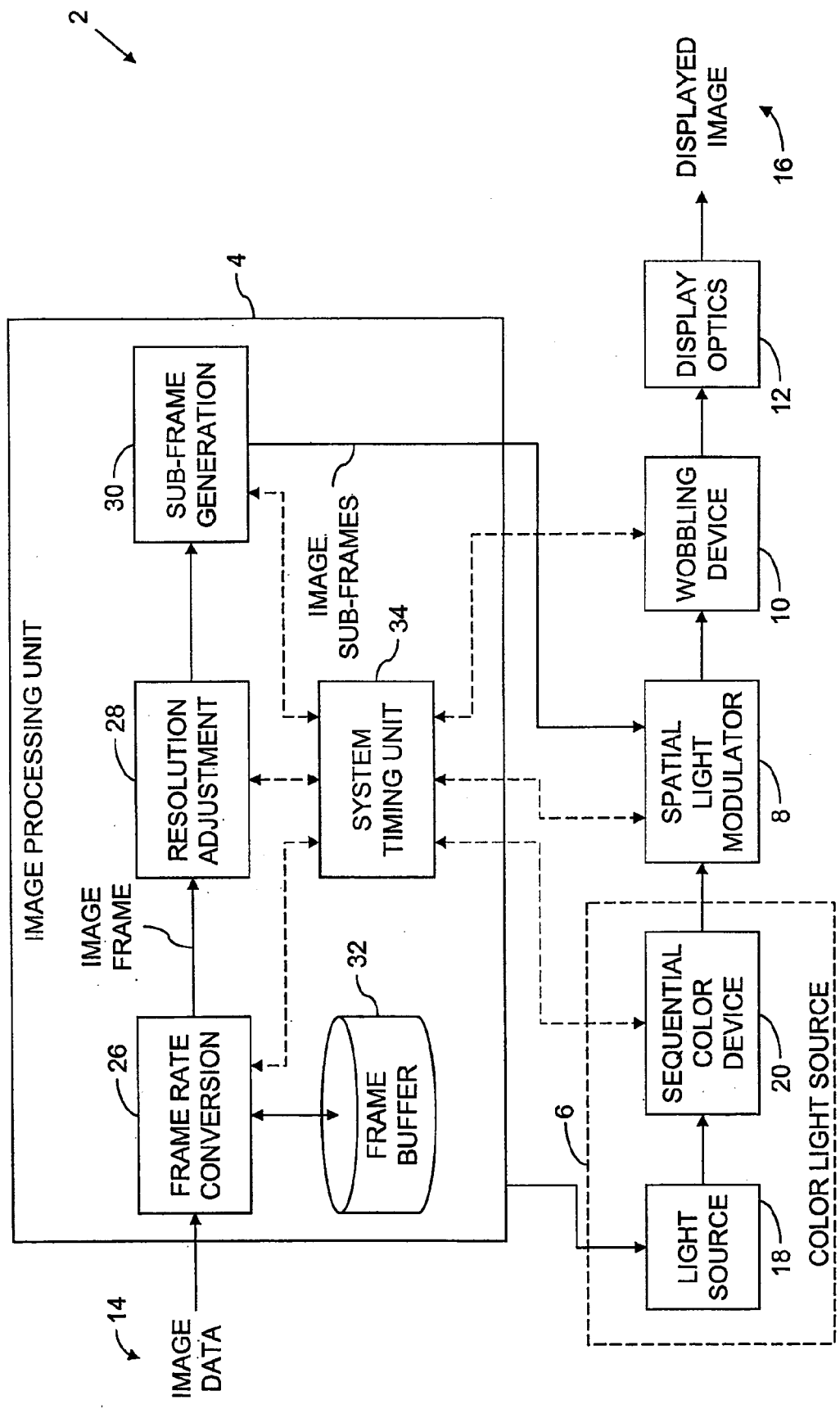
FIG. 9 is a block diagram illustrating the display system of FIG. 1, showing one embodiment of the image processing unit in more detail.

Image processing unit 4 performs various functions including controlling the illumination of light source 18 and controlling SLM 8. Image processing unit 4 may be configured to receive and process digital image data, analog image data, or a combination of analog and digital data. In one embodiment, as illustrated in FIG. 9, image processing unit 4 includes frame rate conversion unit 26, resolution adjustment unit 28, sub-frame generation module 30, frame buffer 32, and system timing unit 34.

Frame rate conversion unit 26 and image frame buffer 32 receive and buffer image data 14 to create an image frame corresponding to image data 14. Resolution adjustment unit 28 adjusts the resolution of the frame to match the resolution capability of display system 2.

Sub-frame generation module 30 processes the image frame data to define two or more image sub-frames corresponding to the image frame. The image sub-frames are displayed by display system 2 to produce displayed image 16. System timing unit 34 synchronizes the timing of the various components of display system 2.

Image processing unit 4, including frame rate conversion unit 26, resolution adjustment unit 28, sub-frame generation module 30, and system timing unit 34, include hardware, executable code, or a combination of these. In one embodiment, one or more components of image processing unit 4 are included in a computer, computer server, or other microprocessor-based system capable of performing a sequence of logic operations. In addition, the image processing may be distributed throughout display system 2 with individual portions of image processing unit 4 being implemented in separate system components.

Frame rate conversion unit 26 receives image data 14 corresponding to an image that is to be displayed by display system 2 and buffers or stores image data 14 in image frame buffer 32. More specifically, frame rate conversion unit 26 receives image data 14 representing individual lines or fields of the image and buffers image data 14 in image frame buffer 32 to create an image frame that corresponds to the image that is to be displayed by display system 2. Image frame buffer 32 may buffer image data 14 by receiving and storing all of image data 14 corresponding to the image frame. Frame rate conversion unit 26 may generate the image frame by subsequently retrieving or extracting all of image data 14 for the image frame from image frame buffer 32. As such, the image frame is defined to comprise a plurality of individual lines or fields of image data 14 representing an entirety of the image that is to be displayed by display system 2. Thus, the image frame includes a plurality of columns and a plurality of rows of individual pixels representing the image 16 that is to be displayed by display system 2.

Frame rate conversion unit 26 and image frame buffer 32 can receive and process image data 14 as progressive image data, interlaced image data, or both progressive image data and interlaced image data. With progressive image data, frame rate conversion unit 26 and image frame buffer 32 receive and store sequential fields of image data 14 for the image. Frame rate conversion unit 26 creates the image frame by retrieving the sequential fields of image data 14 for the image. With interlaced image data, frame rate conversion unit 26 and image frame buffer 32 receive and store the odd fields and the even fields of image data 14 for the image. For example, all of the odd fields of image data 14 are received and stored and all of the even fields of image data 14 are received and stored. As such, frame rate conversion unit 26 de-interlaces image data 14 and creates the image frame by retrieving the odd and even fields of image data 14 for the image.

Image frame buffer 32 includes memory for storing image data 14 for one or more image frames of respective images. For example, image frame buffer 32 may comprise non-volatile memory such as a hard disk drive or other persistent storage device or include volatile memory such as random access memory (RAM).

By receiving image data 14 at frame rate conversion unit 26 and buffering image data 14 in image frame buffer 32, the input timing of image data 14 can be decoupled from timing requirements of the remaining components in display system 2 (e.g.; SLM 8, wobbling device 10, and display optics 12). More specifically, since image data 14 for the image frame is received and stored by image frame buffer 32, image data 14 may be received at any input rate. As such, the frame rate of the image frame may be converted to the timing requirement of the remaining components in display system 2. For example, image data 14 may be received by image processing unit 4 at a rate of 30 frames per second while SLM 8 may be configured to operate at 60 frames per second. In this case, frame rate conversion unit 26 converts the frame rate from 30 frames per second to 60 frames per second.

Resolution adjustment unit 28 receives image data 14 for an image frame and adjusts a resolution of image data 14. More specifically, image processing unit 4 receives image data 14 for the image frame at an original resolution and processes image data 14 to match the resolution that display system 2 is configured to display. Image processing unit 4 increases, decreases, or leaves unaltered the resolution of image data 14 to match the resolution that display system 2 is configured to display.

In one embodiment, sub-frame generation module 30 receives and processes image data 14 for an image frame and defines a number of image sub-frames corresponding to the image frame. If the resolution adjustment unit 28 has adjusted the resolution of image data 14, the sub-frame generation module 30 receives image data 14 at the adjusted resolution. Each of the image sub-frames comprises a data array or matrix that represents a subset of image data 14 corresponding to the image that is to be displayed. The data arrays comprise pixel data defining the content of pixels in a pixel area equal to the pixel area of the corresponding image frame. Because each image sub-frame is displayed in spatially different image sub-frame locations, each of the image sub-frames' data arrays comprise slightly different pixel data. In one embodiment, image processing unit 4 may only generate image sub-frames corresponding to an image that is to be displayed as opposed to generating both an image frame and corresponding image sub-frames.

As mentioned, each image sub-frame in a group of image sub-frames corresponding to an image frame comprises a matrix or array of pixel data corresponding to an image to be displayed. In one embodiment, each image sub-frame is input to SLM 8. SLM 8 modulates a light beam in accordance with the sub-frames and generates a light beam bearing the sub-frames. The light beam bearing the individual image sub-frames is eventually displayed by display optics 12 to create a displayed image. However, after light corresponding to each image sub-frame in a group of sub-frames is modulated by SLM 8 and before each image sub-frame is displayed by display optics 12, wobbling device 10 shifts the position of the light path between SLM 8 and display optics 12. In other words, the wobbling device shifts the pixels such that each image sub-frame is displayed by display optics 12 in a slightly different spatial position than the previously displayed image sub-frame. Thus, because the image sub-frames corresponding to a given image are spatially offset from one another, each image sub-frame includes different pixels or portions of pixels. Wobbling device 10 may shift the pixels such that the image sub-frames are offset from each other by a vertical distance, a horizontal distance, or both a vertical distance and a horizontal distance.

In one embodiment, each of the image sub-frames in a group of sub-frames corresponding to an image is displayed by display optics 12 at a high rate such that the human eye cannot detect the rapid succession between the image sub-frames. The rapid succession of the image sub-frames appears as a single displayed image. By sequentially displaying the image sub-frames in spatially different positions, the apparent resolution of the finally displayed image is enhanced.

In one embodiment, such as for the timing diagrams depicted with respect to FIG. 6 or 7A, each image sub-frame is an RGB (red, green, and blue) color image sub-frame having with data shifted to be consistent with a particular position defined by the wobbling device 10. In this embodiment, one or more of the less significant color bit planes are distributed to less than all of the image sub-frames to minimize the color error for either each frame or groups of frames.

In another embodiment, such as for the timing diagrams depicted with respect to FIG. 7B or 7C, each image sub-frame is generated for a single primary color and optionally white. The data for each primary color is shifted to be consistent with a particular position defined by the wobbling device 10. In this embodiment, all color bit planes (not just the least significant ones) for each primary color are displayed in only one image sub-frame.

FIGS. 10–13 illustrate an exemplary spatial displacement of image sub-frames by an exemplary wobbling device. Sequential color is combined with the spatial displacement of the image sub-frames to produce a displayed color image.

Figure 10C:
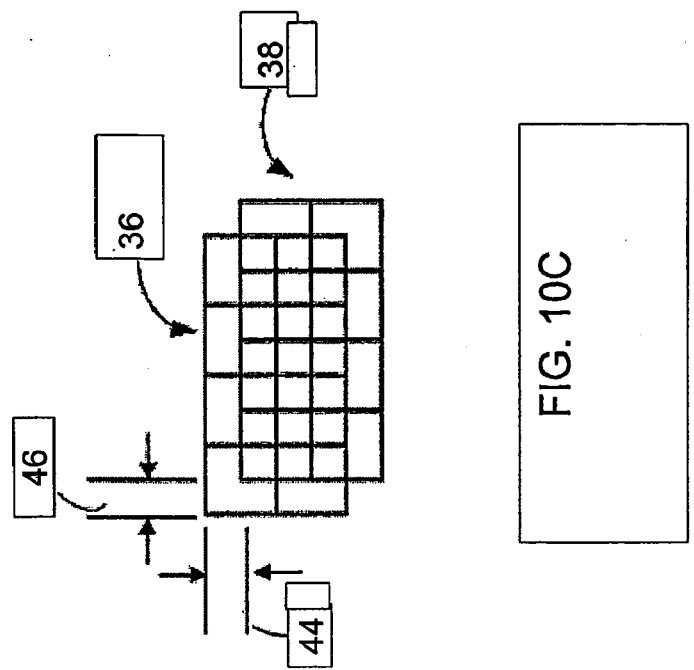
FIGS. 10A–C illustrate that a number of image sub-frames may be generated for a particular image according to one exemplary embodiment.
Figure 10B:
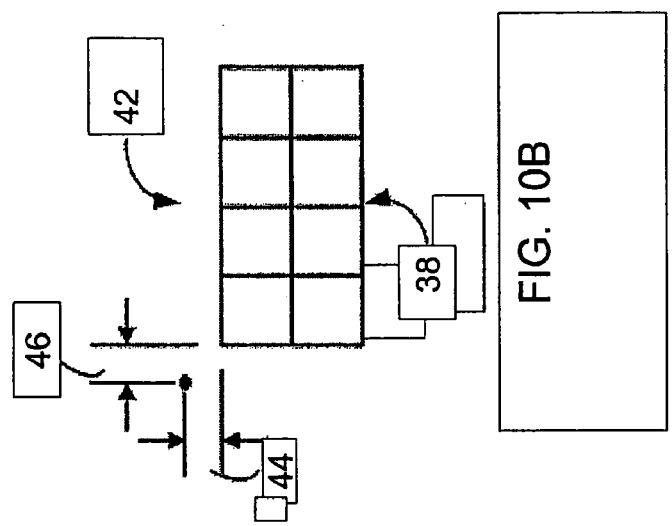
Figure 10A:
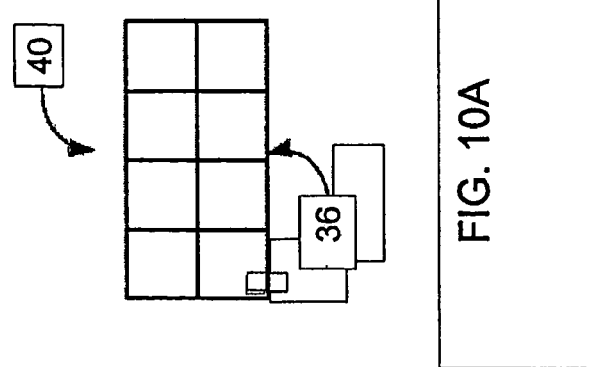

FIGS. 10A–C illustrate an exemplary embodiment wherein a number of image sub-frames are generated for a particular image. As illustrated in FIGS. 10A–C, the exemplary image processing unit 4 generates two image sub-frames for a particular image. More specifically, image processing unit 4 generates first sub-frame 36 and second sub-frame 38 for the image frame. Although the image sub-frames in this example and in subsequent examples are generated by image processing unit 4, it will be understood that the image sub-frames may be generated by sub-frame generation module 30 or by a different component of display system 2. First sub-frame 36 and second sub-frame 38 each comprise image data of a subset of image data 14 for the corresponding image frame. Although the exemplary image processing unit 4 generates two image sub-frames in the example of FIGS. 10A–C, it will be understood that two image sub-frames are an exemplary number of image sub-frames that may be generated by image processing unit 4 and that any number of image sub-frames may be generated in other embodiments.

As illustrated in FIG. 10A, first sub-frame 36 is displayed in first image sub-frame location 40. An image sub-frame location is the relative location in which an image sub-frame is displayed. Each sub-frame location may be spatially distinct from or overlap other sub-frame locations. Second sub-frame 38 is displayed in second image sub-frame location 42 that is offset from first image sub-frame location 40 by vertical distance 44 and horizontal distance 46. As such, second sub-frame 38 is spatially offset from first sub-frame 36 by a predetermined distance. In one illustrative embodiment, as shown in FIG. 10C, vertical distance 44 and horizontal distance 46 are each approximately one-half of one pixel. However, the spatial offset distance between first image sub-frame location 40 and second image sub-frame location 42 may vary as best serves a particular application. In an alternative embodiment, first sub-frame 36 and second sub-frame 38 may only be offset in either the vertical direction or in the horizontal direction. In one embodiment, wobbling device 10 is configured to offset the beam of light between SLM 8 and display optics 12 such that first 36 and second 38 sub-frames are spatially offset from each other.

As illustrated in FIG. 10C, display system 2 alternates between displaying first sub-frame 36 in first image sub-frame location 40 and displaying second sub-frame 38 in second image sub-frame location 42 that is spatially offset from first image sub-frame location 40. More specifically, wobbling device 10 shifts the display of second sub-frame 38 relative to the display of first sub-frame 36 by vertical distance 44 and by horizontal distance 46. As such, the pixels of first sub-frame 36 overlap the pixels of second sub-frame 38. In one embodiment, the display system 2 completes one cycle of displaying first sub-frame 36 in first image sub-frame location 40 and displaying second sub-frame 38 in second image sub-frame location 42 resulting in a displayed image with an enhanced apparent resolution. Thus, second sub-frame 38 is spatially and temporally displaced relative to first sub-frame 36. However, the two sub-frames are seen together by an observer as an enhanced single image.

Figure 11B:
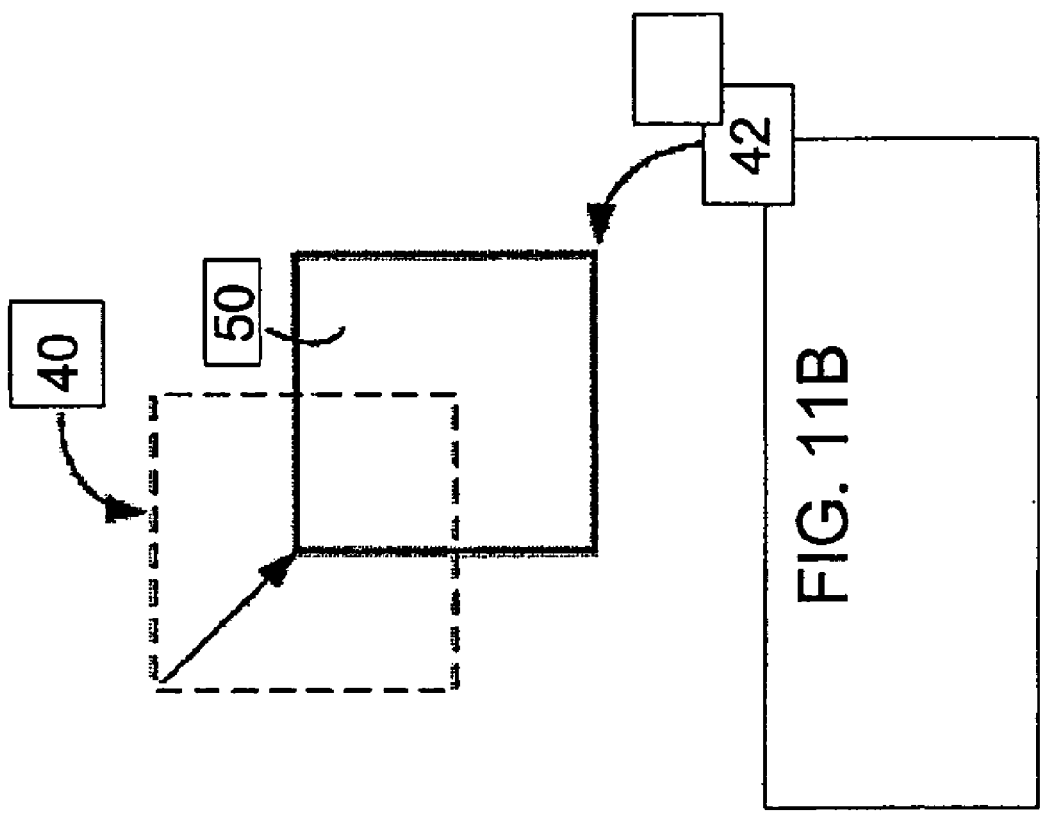
FIGS. 11A–B illustrate displaying a pixel from the first sub-frame in a first image sub-frame location and displaying a pixel from the second sub-frame in the second image sub-frame location according to one exemplary embodiment.
Figure 11A:
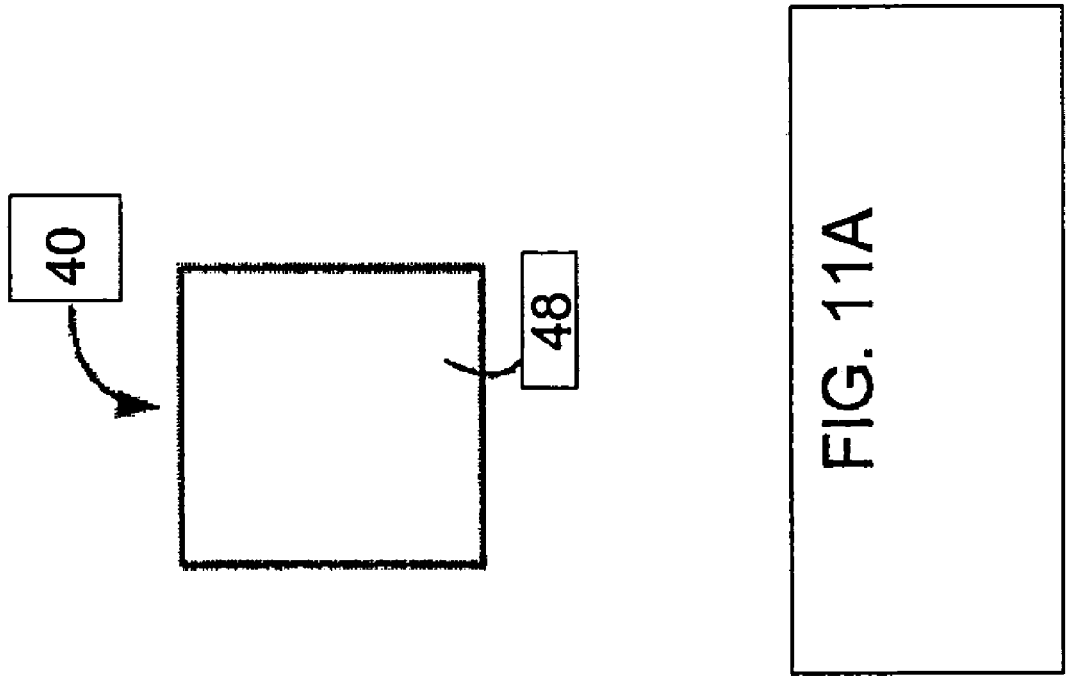

FIGS. 11A–B illustrate an exemplary embodiment of completing one cycle of displaying pixel 48 from first sub-frame 36 in first image sub-frame location 40 and displaying pixel 50 from second sub-frame 38 in second image sub-frame location 42. FIG. 11A illustrates the display of pixel 48 from first sub-frame 36 in first image sub-frame location 40. FIG. 11B illustrates the display of pixel 50 from second sub-frame 38 in second image sub-frame location 42. In FIG. 11B, first image sub-frame location 40 is illustrated by dashed lines.

By generating a first 36 and second 38 sub-frame and displaying the two sub-frames 36, 38 in the spatially offset manner as illustrated in FIGS. 10A–C and FIGS. 11A–B, twice the amount of pixel data is used to create the finally displayed image as compared to the amount of pixel data used to create a finally displayed image without using the image sub-frames. Accordingly, with two-position processing, the resolution of the finally displayed image is increased by a factor of approximately 1.4 or the square root of two.

In another embodiment, as illustrated in FIGS. 12A–D, image processing unit 4 defines four image sub-frames for an image frame. More specifically, image processing unit 4 defines first sub-frame 36, second sub-frame 38, third sub-frame 52, and fourth sub-frame 54 for the image frame. As such, first sub-frame 36, second sub-frame 38, third sub-frame 52, and fourth sub-frame 54 each comprise image data of a subset of image data 14 for the corresponding image frame.

In one embodiment, as illustrated in FIGS. 12B–D, first sub-frame 36 is displayed in first image sub-frame location 40. Second image sub-frame 38 is displayed in second image sub-frame location 42 that is offset from first image sub-frame location 40 by vertical distance 44 and horizontal distance 46. Third sub-frame 52 is displayed in third image sub-frame location 56 that is offset from first image sub-frame location 40 by horizontal distance 58. Horizontal distance 58 may be, for example, the same distance as horizontal distance 46. Fourth sub-frame 54 is displayed in fourth image sub-frame location 60 that is offset from first image sub-frame location 40 by vertical distance 62. Vertical distance 62 may be, for example, the same distance as vertical distance 44. As such, second sub-frame 38, third sub-frame 52, and fourth sub-frame 54 are each spatially offset from each other and spatially offset from first sub-frame 36 by a predetermined distance. In one illustrative embodiment, vertical distance 44, horizontal distance 46, horizontal distance 58, and vertical distance 62 are each approximately one-half of one pixel. However, the spatial offset distance between the four sub-frames may vary as best serves a particular application. In one embodiment, wobbling device 10 is configured to offset the beam of light between SLM 8 and display optics 12 such that the first 36, second 38, third 52, and fourth 54 sub-frames are spatially offset from each other.

In one embodiment, display system 2 completes one cycle of displaying first sub-frame 36 in first image sub-frame location 40, displaying second sub-frame 38 in second image sub-frame location 42, displaying third sub-frame 52 in third image sub-frame location 56, and displaying fourth sub-frame 54 in fourth image sub-frame location 60 resulting in a displayed image with an enhanced apparent resolution. Thus, second sub-frame 38, third sub-frame 52, and fourth sub-frame 54 are spatially and temporally displaced relative to each other and relative to first sub-frame 36.

FIGS. 13A–D illustrate an exemplary embodiment of completing one cycle of displaying pixel 48 from first sub-frame 36 in first image sub-frame location 40, displaying pixel 50 from second sub-frame 38 in second image sub-frame location 42, displaying pixel 64 from third sub-frame 52 in third image sub-frame location 56, and displaying pixel 66 from fourth sub-frame 54 in fourth image sub-frame location 60. FIG. 13A illustrates the display of pixel 48 from first sub-frame 36 in first image sub-frame location 40. FIG. 13B illustrates the display of pixel 50 from second sub-frame 38 in second image sub-frame location 42 where first image sub-frame location 40 is illustrated by dashed lines. FIG. 13C illustrates the display of pixel 64 from third sub-frame 52 in third image sub-frame location 56 where first 40 and second 42 image sub-frame location are illustrated by dashed lines. Finally, FIG. 13D illustrates the display of pixel 66 from fourth sub-frame 54 in fourth image sub-frame location 60 where first 40, second 42, and third 56 image sub-frame location are illustrated by dashed lines.

By generating four image sub-frames and displaying the four sub-frames in the spatially offset manner as illustrated in FIGS. 12A–D and FIGS. 13A–D, four times the amount of pixel data is used to create the finally displayed image as compared to the amount of pixel data used to create a finally displayed image without using the image sub-frames. Accordingly, with four-position processing, the resolution of the finally displayed image is increased by a factor of two or the square root of four.

As shown by the examples in FIGS. 10–13, by generating a number of image sub-frames for an image frame and spatially and temporally displaying the image sub-frames relative to each other, display system 2 can produce a displayed image with a resolution greater than that which SLM 8 is configured to display. In one illustrative embodiment, for example, with image data 14 having a resolution of 800 pixels by 600 pixels and SLM 8 having a resolution of 800 pixels by 600 pixels, four-position processing by display system 2 with resolution adjustment of image data 14 produces a displayed image with a resolution of 1600 pixels by 1200 pixels.

In addition, by overlapping pixels of image sub-frames, display system 2 may reduce the undesirable visual effects caused by a defective pixel. For example, if four sub-frames are generated by image processing unit 4 and displayed in offset positions relative to each other, the four sub-frames effectively diffuse the undesirable effect of the defective pixel because a different portion of the image that is to be displayed is associated with the defective pixel in each sub-frame. A defective pixel is defined to include an aberrant or inoperative display pixel such as a pixel which exhibits only an "on" or "off" position, a pixel which produces less intensity or more intensity than intended, or a pixel with inconsistent or random operation.

Figure 14A:
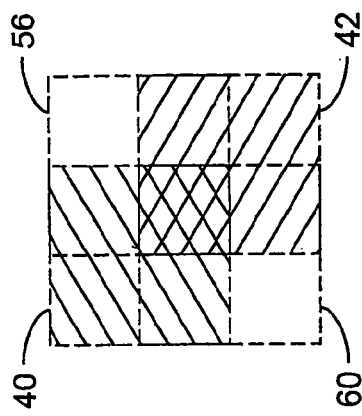
FIGS. 14A–C illustrate one embodiment of color image bit-planes unequally distributed between image sub-frames.
Figure 14B:
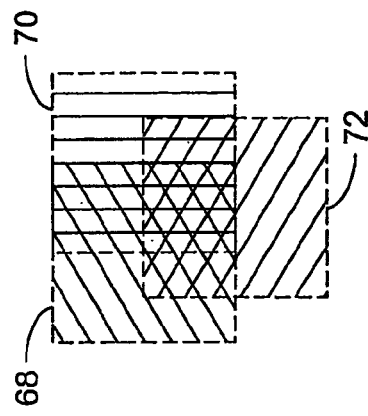
Figure 14C:
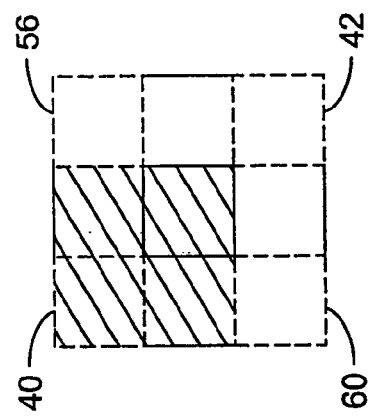

Sub-frame generation module 30 generates color image bit-planes from image data 14. The color image bit-planes are generated so that, for at least one of the colors, at least the least significant color image bit-plane B0 is displayed in less than all of the sub-frame locations or at least the least significant color image bit-plane B0 is unequally distributed between the image sub-frames. FIGS. 14A–14C illustrate one example of color image bit-planes displayed in less than all of the sub-frame locations.

FIG. 14A shows least significant bit-plane B0 displayed in only first image sub-frame location 40. Each of the least significant bits B0 for first 40, second 42, third 56, and fourth 60 image sub-frame locations is added together and displayed only in first sub-frame location 40. Hatching on a sub-frame location represents light displayed on the sub-frame location. For example, the hatching on first image sub-frame location 40 represents light displayed, for one color, at first image sub-frame location 40 by each of the bit-planes B0.

In FIG. 14B, more than one of the least significant bits are displayed in less than all of the bit plane locations. For example, bit planes B0 and B1, for each of the sub-frame locations, are displayed in only first 40 and second 42 sub-frame locations and not in third 56 and fourth 60 sub-frame locations.

Likewise, in FIG. 14C, more than one of the least significant bits are displayed in less than all of the bit plane locations. For example, bit planes B0, B1, and B2, for each of the sub-frame locations, are displayed in only first 40, second 42, and third 56 sub-frame locations and not in fourth sub-frame location 60.

Figure 15:
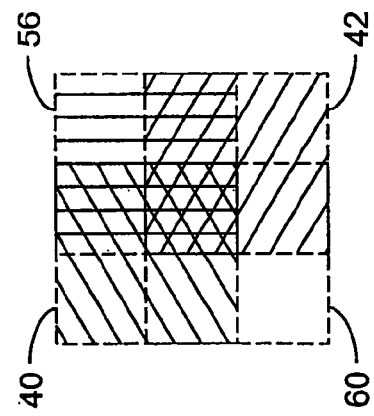
FIG. 15 illustrates, for each color, all the bit-planes displayed in a single image sub-frame location.

FIG. 15 illustrates an alternate embodiment wherein for each color, all the bit-planes are displayed in a single image sub-frame location. In one embodiment, three colors are displayed, red, green, and blue. All of the red bit-planes are displayed in first sub-frame position 68. All of the green bit-planes are displayed in second sub-frame position 70. All of the blue bit-planes are displayed in third sub-frame position 72. This would be consistent with the timing diagrams depicted with respect to FIG. 7B or 7C.

Figure 16:
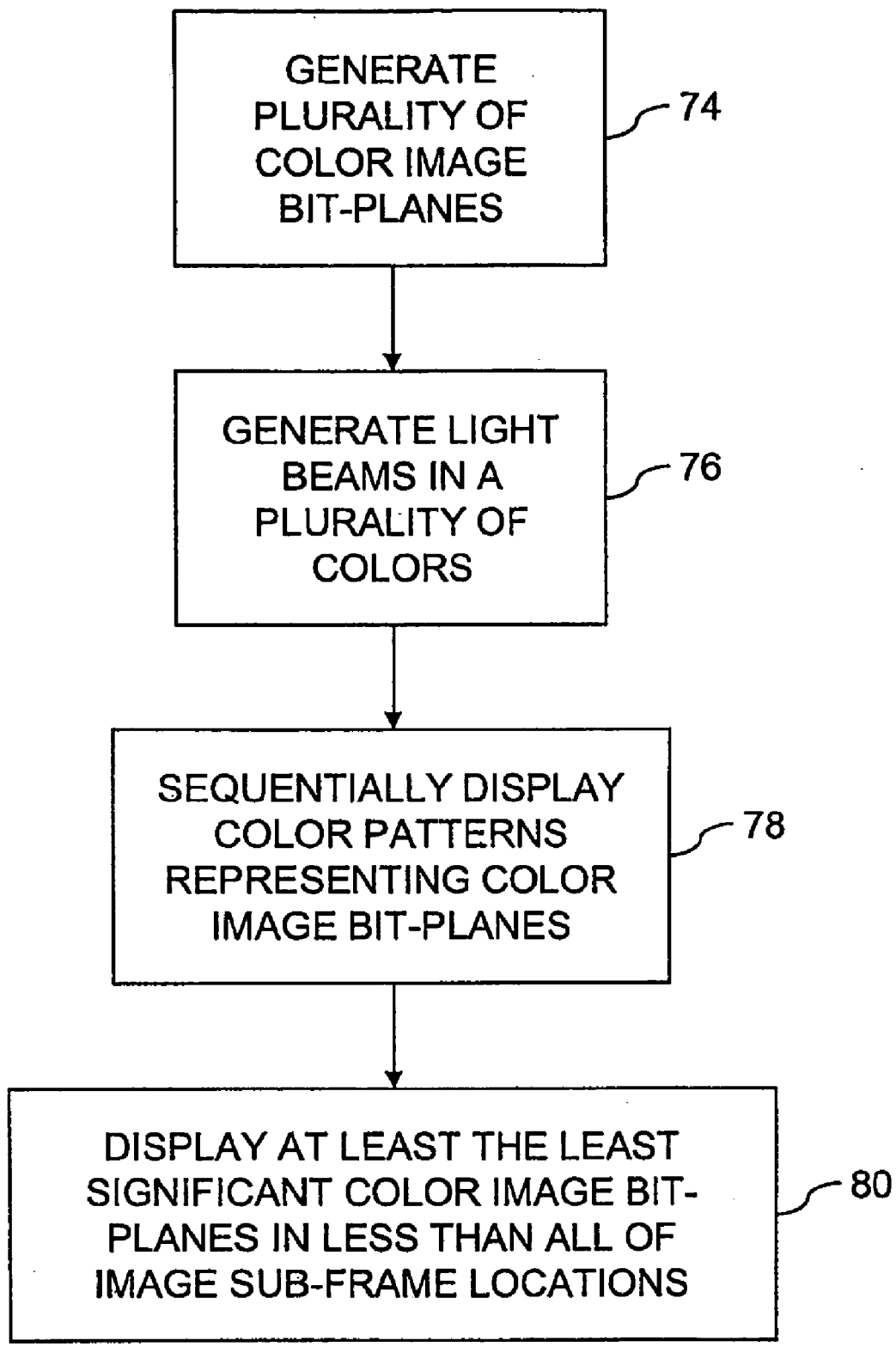
FIG. 16 is a flow chart illustrating one embodiment of the present invention method for creating color image sub-frames.

FIG. 16 is a flow chart representing steps of one embodiment of the present invention for producing a color image from image data 14. Although the steps represented in FIG. 16 are presented in a specific order, the present invention encompasses variations in the order of steps. Furthermore, additional steps may be executed between the steps illustrated in FIG. 16 without departing from the scope of the present invention. In one embodiment, steps illustrated in FIG. 16 are performed by sub-frame generation module 30.

Color image bit-planes are generated 74 from image data 14. Each color image bit-plane represents a time increment for displaying one color for each pixel of a color image. The smallest time increment for each color is represented by a least significant color image bit-plane.

Light beams are generated 76 in each of the colors. For each of the colors, color patterns representing the color image bit-planes are displaying 78 in a plurality of image sub-frame locations. For at least one of the colors, at least the least significant color image bit-plane is displayed 80 in less than all of the image sub-frame locations.

In one embodiment, displaying 80 at least the least significant color image bit-planes in less than all of the image sub-frame locations comprises displaying at least the least significant color image bit-planes in a single image sub-frame location.

In an alternate embodiment, displaying 80 at least the least significant color image bit-planes in less than all of the image sub-frame locations comprises displaying, for each color, all the bit-planes in a single image sub-frame location as consistent with FIG. 7B or 7C In another embodiment, displaying 80 at least the least significant color image bit-planes in less than all of the image sub-frame locations comprises defining less than the full color depth of at least one of the colors in at least one of the plurality of image sub-frame locations.

Figure 17:
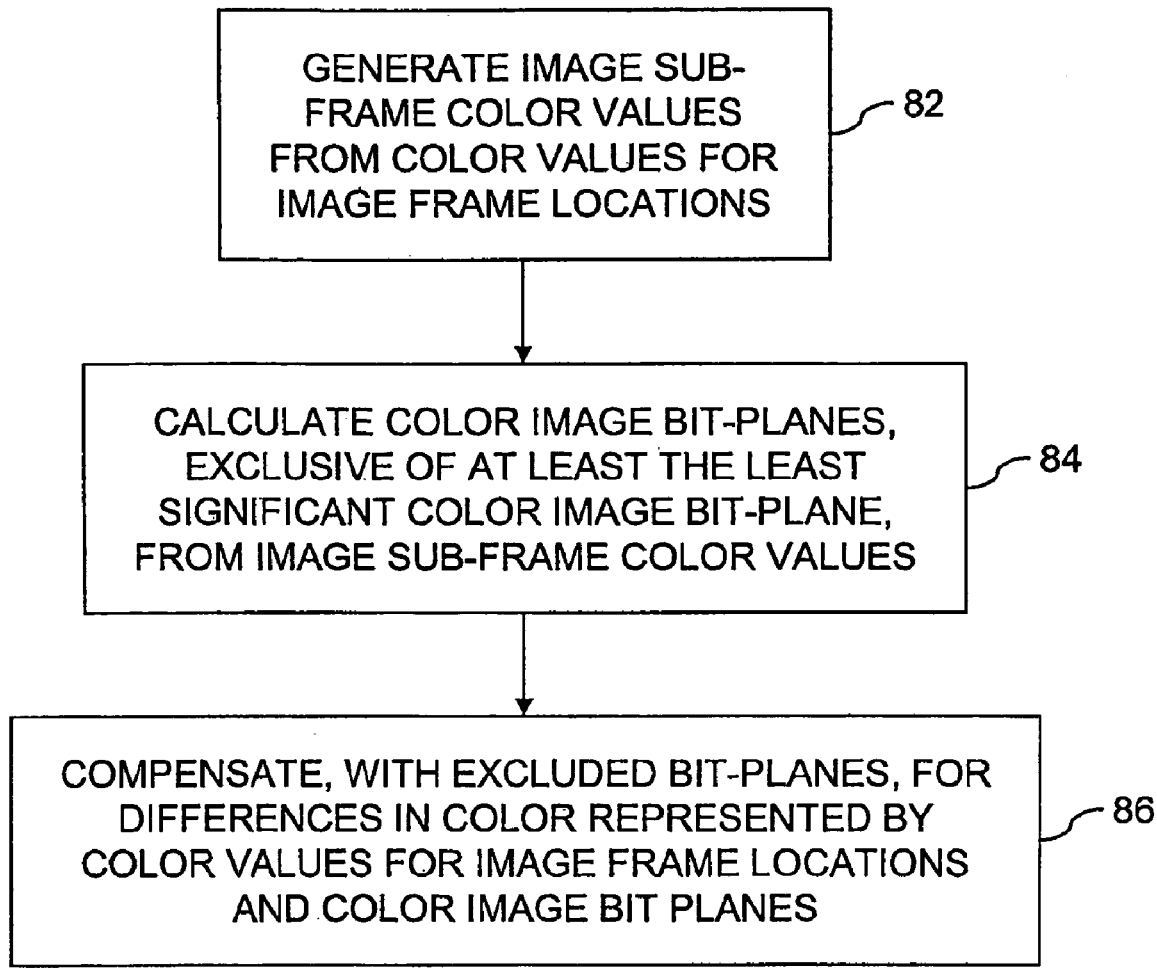
FIG. 17 is a flow chart illustrating one embodiment of generating a plurality of color image bit-planes.

FIG. 17 is a flow chart representing steps of one embodiment of generating a plurality of color image bit-planes wherein image data 14 includes color values for image frame locations. Although the steps represented in FIG. 17 are presented in a specific order, the present invention encompasses variations in the order of steps. Furthermore, additional steps may be executed between the steps illustrated in FIG. 17 without departing from the scope of the present invention. In one embodiment, steps illustrated in FIG. 17 are performed by sub-frame generation module 30.

Image sub-frame color values are generated 82 from the color values for the image frame locations. Color image bit-planes, excluding at least the least significant color image bit-plane, are calculated 84 from the image sub-frame color values. The differences in color represented by the color values for the image frame locations and the color image bit planes are compensated 86 for with the excluded bit-planes.

Figure 18:
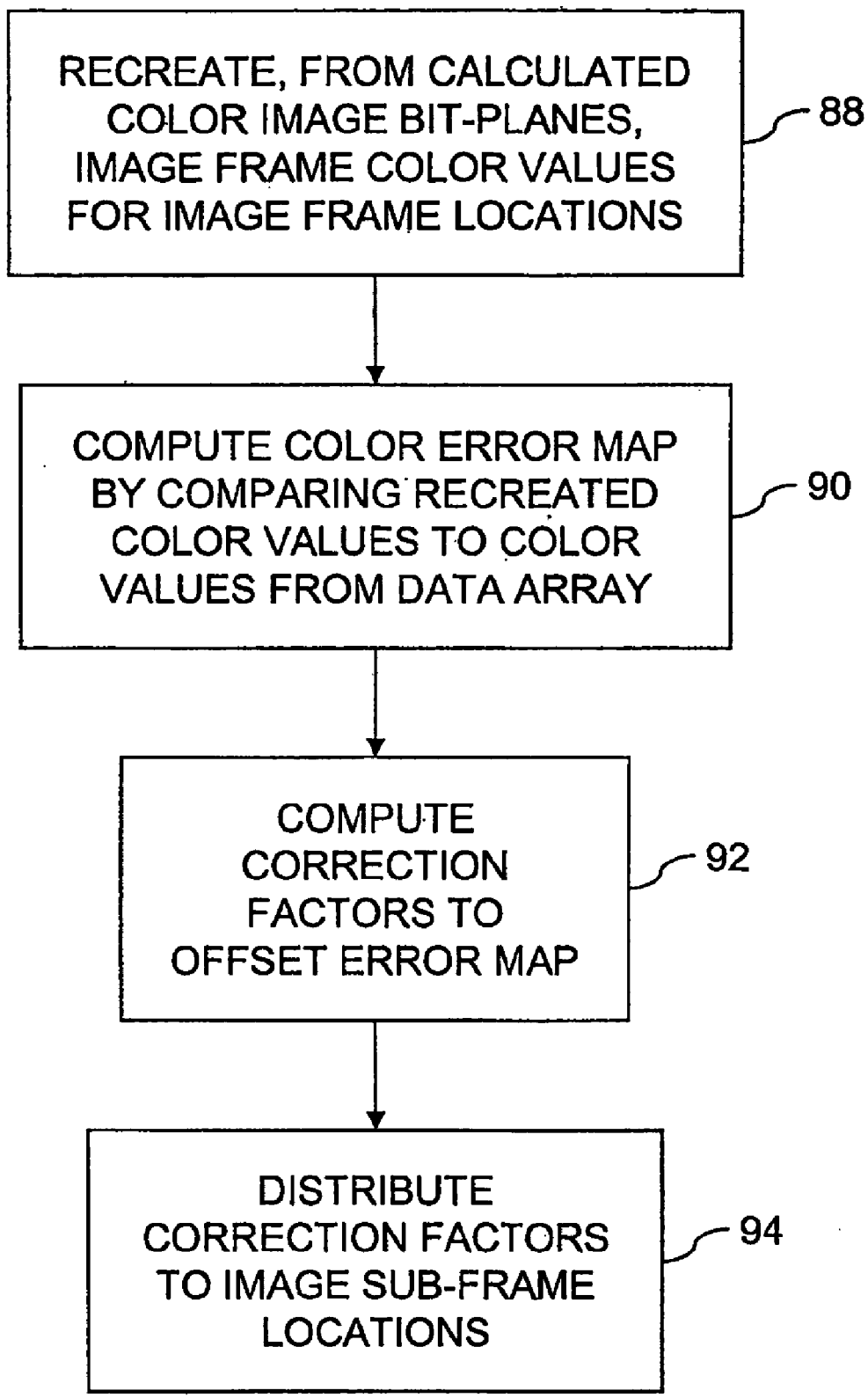
FIG. 18 is a flow chart illustrating one embodiment of compensating for differences in color represented by color values.

FIG. 18 is a flow chart representing steps of another embodiment of compensating for differences in color represented by color values. Although the steps represented in FIG. 18 are presented in a specific order, the present invention encompasses variations in the order of steps. Furthermore, additional steps may be executed between the steps illustrated in FIG. 18 without departing from the scope of the present invention.

Image frame color values for the image frame locations are recreated 88 from the calculated color image bit-planes. A color error map is computed 90 by comparing the recreated color values to the color values from image data 14. Correction factors are computed 92 to offset the error map. The correction factors are distributed 94 to image sub-frame locations.

The foregoing description is only illustrative of the invention. Various alternatives, modifications, and variances can be devised by those skilled in the art without departing from the invention. Accordingly, the present invention embraces all such alternatives, modifications, and variances that fall within the scope of the appended claims.

What is claimed is:

1. A display system for producing a color image from image data, the color image having pixels, the display system comprising:

a sub-frame generation module configured to generate, from the image data, color image bit-planes, each color image bit-plane representing a time increment for displaying one color of a plurality of colors for each pixel of the color image, the smallest time increment for each color represented by a least significant color image bit-plane, the color image bit-planes defining image sub-frames with, for at least one of the colors, at least the least significant color image bit-plane unequally distributed between the image sub-frames;

a spatial light modulator configured to modulate light beams to generate each of the image sub-frames;

a color light source configured to generate light beams in each of the plurality of colors, the color light source disposed to pass the light beams across the spatial light modulator; and a periodic wobbling device configured to provide a relative displacement to the image sub-frames for displaying, in a plurality of spatially different image sub-frame locations, the image sub-frames.

2. The display system of claim 1 wherein the image data includes color values for image frame locations and wherein the sub-frame generation module configured to generate color image bit-planes comprises the sub-frame generation module configured to:

generate image sub-frame color values from the color values for the image frame locations;

calculate color image bit-planes, exclusive of at least the least significant color image bit-plane, from the image sub-frame color values; and compensate, with the excluded bit-planes, for differences in color represented by the color values for the image frame locations and the color image bit planes.

3. The display system of claim 2 wherein the sub-frame generation module configured to compensate for differences in color comprises the sub-frame generation module configured to:

recreate, from the calculated color image bit-planes, image frame color values for the image frame locations;
compute a color error map by comparing the recreated color values to the color values from the image data;
compute correction factors to offset the error map; and
distribute the correction factors to image sub-frame locations.

4. The display system of claim 1 wherein the sub-frame generation module configured to generate color image bit-planes comprises the sub-frame generation module configured to generate color image bit-planes, the color image bit-planes defining image sub-frames with, for at least one of the colors, at least the least significant color image bit-plane distributed into a single image sub-frame.

5. The display system of claim 1 wherein the sub-frame generation module configured to generate color image bit-planes comprises the sub-frame generation module configured to generate color image bit-planes, the color image bit-planes defining image sub-frames with, for each color, all the bit-planes distributed into a single sub-frame.

6. The display system of claim 1 wherein the sub-frame generation module configured to generate color image bit-planes comprises the sub-frame generation module configured to generate color image bit-planes, the color image bit-planes defining image sub-frames with, less than the full color depth of at least one of the colors defined in at least one of the image sub-frames.

7. A display system for producing a color image from image data, the color image having pixels, the display system comprising:
    means for generating, from the image data, color image bit-planes, each color image bit-plane representing a time increment for displaying one color of a plurality of colors for each pixel of the color image, the smallest time increment for each color represented by a least significant color image bit-plane, the color image bit-planes defining image sub-frames with, for at least one of the colors, at least the least significant color image bit-plane unequally distributed between the image sub-frames;
    means for modulating light beams to generate each of the image sub-frames;
    means for generating light beams in each of the plurality of colors, the color light source disposed to pass the light beams across the spatial light modulator; and
    means for providing a relative displacement to the image sub-frames for displaying, in a plurality of spatially different image sub-frame locations, the image sub-frames.

8. The display system of claim 7 wherein the image data includes color values for image frame locations and wherein the means for generating color image bit-planes comprises:
    means for generating image sub-frame color values from the color values for the image frame locations;
    means for calculating color image bit-planes, exclusive of at least the least significant color image bit-plane, from the image sub-frame color values; and
    means for compensating, with the excluded bit-planes, for differences in color represented by the color values for the image frame locations and the color image bit planes.

9. The display system of claim 8 wherein the means for compensating comprises:
    means for compensating recreating, from the calculated color image bit-planes, image frame color values for the image frame locations;
    means for computing a color error map by comparing the recreated color values to the color values from the image data;
    means for computing correction factors to offset the error map; and
    means for distributing the correction factors to image sub-frame locations.

10. The display system of claim 7 wherein the means for generating color image bit-planes comprises means for generating color image bit-planes, the color image bit-planes defining image sub-frames with, for at least one of the colors, at least the least significant color image bit-plane distributed into a single image sub-frame.

11. The display system of claim 7 wherein the means for generating color image bit-planes comprises means for generating color image bit-planes, the color image bit-planes defining image sub-frames with, for each color, all the bit-planes distributed into a single sub-frame.

12. The display system of claim 7 wherein the means for generating color image bit-planes comprises means for generating color image bit-planes, the color image bit-planes defining image sub-frames with, less than the full color depth of at least one of the colors defined in at least one of the image sub-frames.

13. A display system for producing a color image from image data, the color image having pixels, the display system comprising:
    a sub-frame generation module configured to generate, from the image data, color image bit-planes, each color image bit-plane representing a time increment for displaying one color of a plurality of colors for each pixel of the color image, the smallest time increment for each color represented by a least significant color image bit-plane, the color image bit-planes defining image sub-frames with, for at least one of the colors, at least the least significant color image bit-plane unequally distributed between the image sub-frames;
    a spatial light modulator configured to modulate light beams to generate each of the image sub-frames;
    a color light source configured to generate light beams in each of the plurality of colors, the color light source disposed to pass the light beams across the spatial light modulator; and
    a periodic wobbling device configured to provide a relative spatially different displacement to the image sub-frames for displaying, in a plurality of image sub-frame periods, the image sub-frames.

14. The display system of claim 13 wherein the image data includes color values for image frame periods and wherein the sub-frame generation module configured to generate color image bit-planes comprises the sub-frame generation module configured to:
    generate image sub-frame color values from the color values for the image frame periods;
    calculate color image bit-planes, exclusive of at least the least significant color image bit-plane, from the image sub-frame color values; and
    compensate, with the excluded bit-planes, for differences in color represented by the color values for the image frame periods and the color image bit planes.

15. The display system of claim 14 wherein the sub-frame generation module configured to compensate for differences in color comprises the sub-frame generation module configured to:
    recreate, from the calculated color image bit-planes, image frame color values for the image frame periods;

compute a color error map by comparing the recreated color values to the color values from the image data;
compute correction factors to offset the error map; and
distribute the correction factors to image sub-frame periods.

16. The display system of claim 13 wherein the sub-frame generation module configured to generate color image bit-planes comprises the sub-frame generation module configured to generate color image bit-planes, the color image bit-planes defining image sub-frames with, for at least one of the colors, at least the least significant color image bit-plane distributed into a single image sub-frame.

17. The display system of claim 13 wherein the sub-frame generation module configured to generate color image bit-planes comprises the sub-frame generation module configured to generate color image bit-planes, the color image bit-planes defining image sub-frames with, for each color, all the bit-planes distributed into a single sub-frame.

18. The display system of claim 13 wherein the sub-frame generation module configured to generate color image bit-planes comprises the sub-frame generation module configured to generate color image bit-planes, the color image bit-planes defining image sub-frames with, less than the full color depth of at least one of the colors defined in at least one of the image sub-frames.

19. A display system for producing a color image from image data, the color image having pixels, the display system comprising:
means for generating, from the image data, color image bit-planes, each color image bit-plane representing a time increment for displaying one color of a plurality of colors for each pixel of the color image, the smallest time increment for each color represented by a least significant color image bit-plane, the color image bit-planes defining image sub-frames with, for at least one of the colors, at least the least significant color image bit-plane unequally distributed between the image sub-frames;
means for modulating light beams to generate each of the image sub-frames;
means for generating light beams in each of the plurality of colors, the color light source disposed to pass the light beams across the spatial light modulator; and
means for providing a relative spatially different displacement to the image sub-frames for displaying, in a plurality of image sub-frame periods, the image sub-frames.

20. The display system of claim 19 wherein the image data includes color values for image frame periods and wherein the means for generating color image bit-planes comprises:
means for generating image sub-frame color values from the color values for the image frame periods;
means for calculating color image bit-planes, exclusive of at least the least significant color image bit-plane, from the image sub-frame color values; and
means for compensating, with the excluded bit-planes, for differences in color represented by the color values for the image frame periods and the color image bit planes.

21. The display system of claim 20 wherein the means for compensating comprises:
means for compensating recreating, from the calculated color image bit-planes, image frame color values for the image frame periods;
means for computing a color error map by comparing the recreated color values to the color values from the image data;
means for computing correction factors to offset the error map; and
means for distributing the correction factors to image sub-frame periods.

22. The display system of claim 19 wherein the means for generating color image bit-planes comprises means for generating color image bit-planes, the color image bit-planes defining image sub-frames with, for at least one of the colors, at least the least significant color image bit-plane distributed into a single image sub-frame.

23. The display system of claim 19 wherein the means for generating color image bit-planes comprises means for generating color image bit-planes, the color image bit-planes defining image sub-frames with, for each color, all the bit-planes distributed into a single sub-frame.

24. The display system of claim 19 wherein the means for generating color image bit-planes comprises means for generating color image bit-planes, the color image bit-planes defining image sub-frames with, less than the full color depth of at least one of the colors defined in at least one of the image sub-frames.

* * * * *